United States Patent
Wan et al.

(10) Patent No.: US 12,461,150 B2
(45) Date of Patent: Nov. 4, 2025

(54) TESTING CIRCUIT

(71) Applicants: Global Unichip Corporation, Hsinchu (TW); Taiwan Semiconductor Manufacturing Company, Ltd., Hsinchu (TW)

(72) Inventors: Yu-Lun Wan, Hsinchu (TW); Bor-Yueh Liu, Hsinchu (TW); Chen-Yuan Kao, Hsinchu (TW); Ting-Yu Chen, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 152 days.

(21) Appl. No.: 18/510,616

(22) Filed: Nov. 15, 2023

(65) Prior Publication Data
US 2025/0155503 A1   May 15, 2025

(51) Int. Cl.
*G01R 31/3185*   (2006.01)
*G01R 31/317*    (2006.01)

(52) U.S. Cl.
CPC ........... *G01R 31/318577* (2013.01); *G01R 31/31727* (2013.01); *G01R 31/318536* (2013.01)

(58) Field of Classification Search
None
See application file for complete search history.

(56) References Cited

U.S. PATENT DOCUMENTS

| | | | |
|---|---|---|---|
| 8,412,994 B2 | 4/2013 | Devta-Prasanna | |
| 8,522,190 B1 | 8/2013 | Sanghani et al. | |
| 2011/0276849 A1* | 11/2011 | Periasamy | G01R 31/318594 714/E11.155 |
| 2012/0030532 A1* | 2/2012 | Jain | G01R 31/318547 714/E11.067 |
| 2013/0219238 A1* | 8/2013 | Tekumalla | G01R 31/318552 714/E11.155 |
| 2014/0365838 A1* | 12/2014 | Tekumalla | G11C 29/04 714/726 |
| 2016/0341795 A1* | 11/2016 | Chandra | G01R 31/318566 |
| 2017/0115351 A1* | 4/2017 | Datla Jagannadha | G06F 11/00 |
| 2021/0018563 A1* | 1/2021 | Rajski | G01R 31/318555 |

\* cited by examiner

*Primary Examiner* — Jermele M Hollington
(74) *Attorney, Agent, or Firm* — JCIPRNET

(57) ABSTRACT

A testing circuit is provided. The testing circuit includes a clock cone, a series of shift register chains, and a control circuit. The clock cone is divided into a plurality of fan-out partitions operated in the same clock domain. The shift register chains are configured to shift out one-hot signals on demand and each shift register chain includes multiple registers with the same amount as fan-out partitions. The control circuit receives the one-hot signals from the shift register chains and enables the divided fan-out partitions therefore.

6 Claims, 5 Drawing Sheets

TESTING CIRCUIT

BACKGROUND

1. Technical Field

The subject application is related to integrated circuits testing, to be more specific, to use clock gating scheme to divide a large clock domain into some smaller groups to reduce scan capture peak power.

2. Description of Related Art

IR drop in scan capture mode could affect the yield in ATE testing dramatically. Moreover, the test coverage is also important for scan test. Thus, how to perform ATE scan testing with good yield and high test coverage has become one of the most critical issues to be resolved in the art.

SUMMARY

The subject application provides a testing circuit, which improves IR drop in scan capture mode to have better yield in ATE testing.

The subject application provides a testing circuit, comprising a clock cone, a series of shift register chains, and a control circuit. The clock cone is divided into a plurality of fan-out partitions operated in the same clock domain. The shift register chains are configured to shift out one-hot signals on demand and each shift register chain comprises multiple registers with the same amount as fan-out partitions. The control circuit receives the one-hot signals from the shift register chains and enables the divided fan-out partitions therefore.

Based on the descriptions above, the testing circuit of the subject application could effectively solve testing errors that caused by IR drop in scan capture mode.

BRIEF DESCRIPTION OF THE DRAWINGS

The figures listed as following provide an overall view of the circuit structure

DESCRIPTION OF THE EMBODIMENTS

Figure 1:
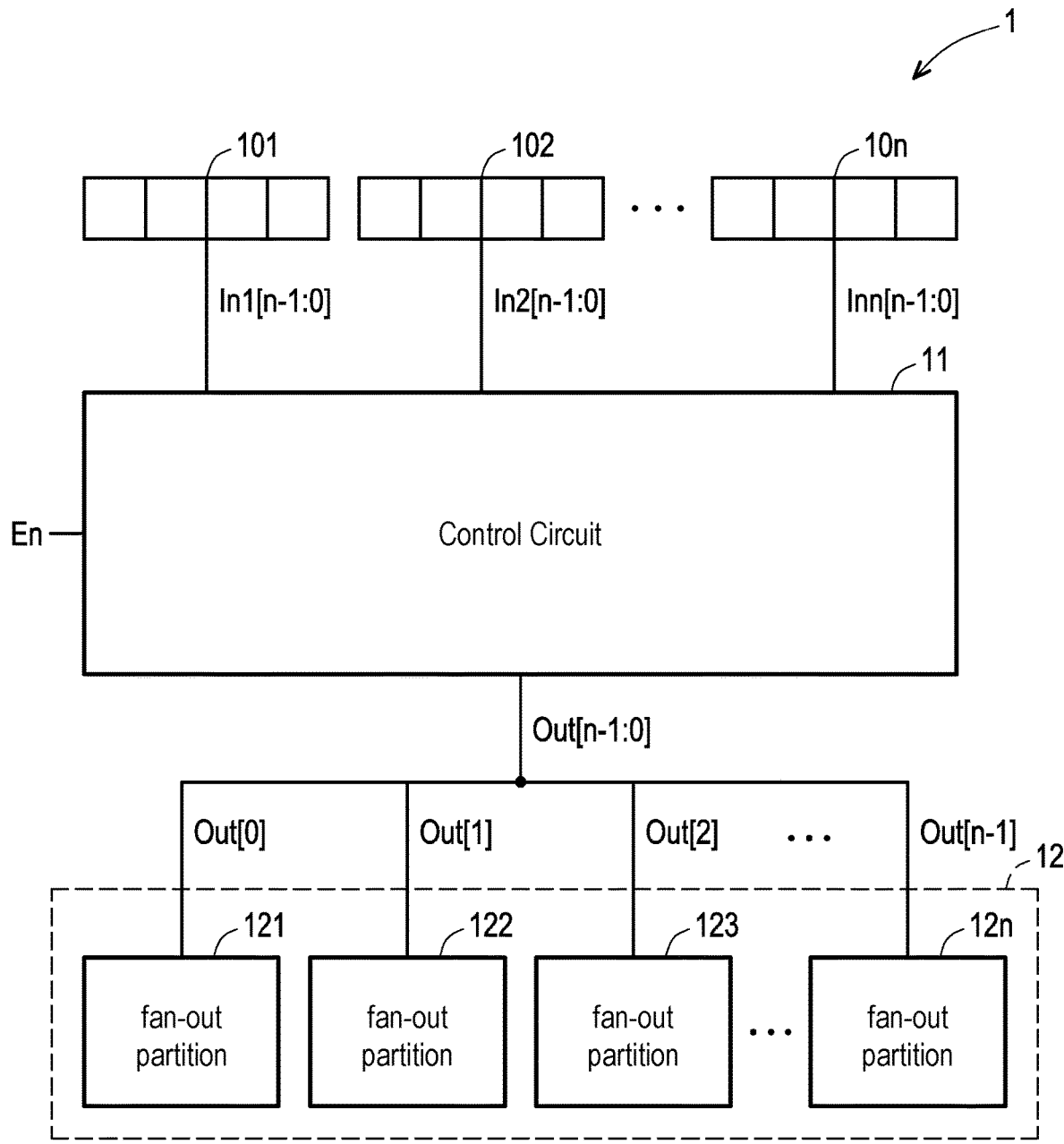
FIG. 1 is a block diagram of the testing circuit according to an embodiment of the subject application.

FIG. 1 is the block diagram of the testing circuit 1 according to an embodiment of the subject application. The testing circuit 1 depicted in FIG. 1 can be integrated in any clocking base design to reduce the IR drop in scan capture mode. In brief, the testing circuit 1 includes a series of shift register chains 101-10$n$, a control circuit 11, and a clock cone 12. The clock cone 12 is a clock tree circuit operated in the same clock domain, and is divided into some smaller fan-out partitions 121-12$n$ in the testing circuit 1. The shift register chains 101-10$n$ could shift out the test signals In1-In$n$ with a series of test bits. Each of the test signals In1-In$n$ should have the same bit number as the amount of the fan-out partitions 121-12$n$, and the test signals In1-In$n$ can be used together with the enable signal En to turn each of the fan-out partitions 121-12$n$ on or off, wherein each of the test signals In1-In$n$ is a one-hot signal. The one-hot signal is the signal having a random bit with the value of 1. Furthermore, the control circuit 11 is connected between the shift register chains 101-10$n$ and the clock cone 12. The control circuit 11 not only receives the test signals In1-In$n$, but also the enable signal En. The control circuit 11 would generate an output signal Out[n−1:0] according to the test signals In1-In$n$ and the enable signal En, thereby controlling each of the fan-out partitions 121-12$n$ to be turned on or off.

In order to improve the IR (voltage) drop effect in scan capture mode, it's necessary to divide the clock cone 12 into the fan-out partitions 121-12$n$, and manipulate the operation by the testing circuit 1.

Firstly, the value of the enable signal En has been decided by the analysis of IR drop in scan capture mode. Secondly, after integrated to the existing scan chains, the shift register chains 101-10$n$ would be able to shift out the test signals In1-In$n$ on demand, and therefore each of the test signal In1-In$n$ should load a random bit with the value of 1 to form a one-hot signal. The output signal Out [n−1:0] would be set at 1 or 0 to control the fan-out partitions 121-12$n$ on or off through the logical operation performed by the control circuit 11 with regard to the test signals In1-In$n$ and the enable signal En. Furthermore, there would be a clock gating cell inserted between each of the fan-out partitions 121-12$n$ and the control circuit 11.

For example, when the enable signal En instructs that the amount of the turned-on fan-out partitions 121-12$n$ of the clock cone 12 is two at most (e.g., En=001), the shift register chains 101-10$n$ would shift out n sets of the test signals In1-In$n$ to the control circuit 11, and the fan-out partitions 121-12$n$ that receive the value "1" from the output signal Out [n−1:0] outputted by the control circuit 11 may be turned on thereafter. Particularly, the value "1" is distributed in the n sets of the test signals In1-In$n$ (i.e., the one-hot signals) randomly.

After decided a maximum number of the fan-out partitions to be turned on at the same time, the number n of the shift register chains 101-10$n$ and the enable signal En could also firm therefore. The number of the shift register in the chain 101-10$n$ should be equal to the fan-out partitions 121-12$n$.

The maximum number of the fan-out partitions could be turned on at the same time by the time the scan IR drop analysis result is determined. Since the maximum number of the fan-out partitions could be turned on at the same time is equal to n, the enable signal En may also be derived according to an N-hot table (Table 1) and the shift register chains 101-10$n$. The number of registers in each shift register chain is equal to the number of the fan-out partitions. Thus, the control circuit 11 may be configured to decide an actual number of the fan-out partitions which are really turned on for testing according to the series of test signals In1-In$n$.

Figure 2A:
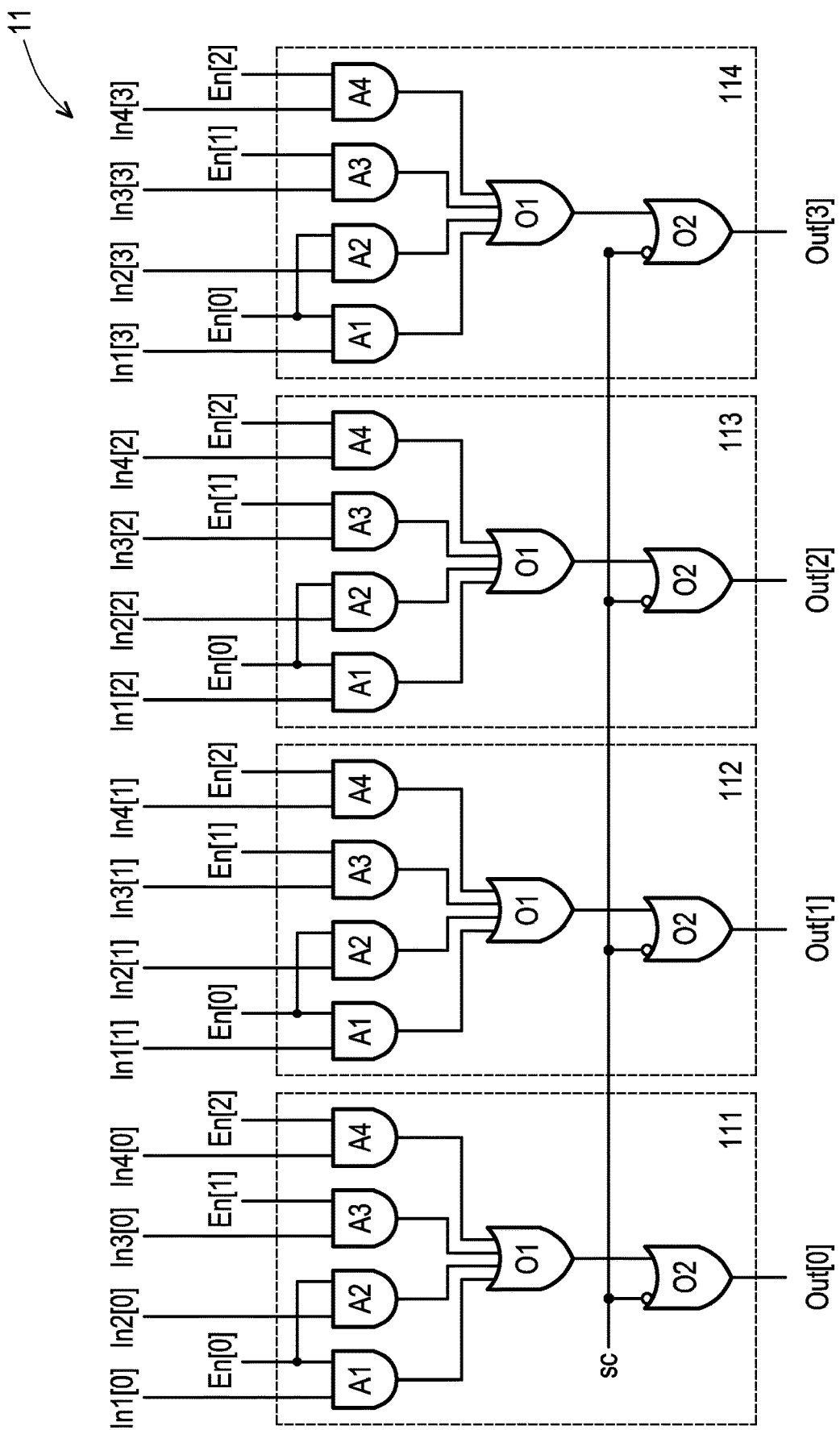
FIG. 2A is a block diagram of the control circuit according to an embodiment of the subject application.

FIG. 2A is the block diagram of a control circuit 11 according to an embodiment of the subject application. In such an embodiment of FIG. 1 that there are four fan-out partitions 121-124, the control circuit 11 includes sub-control circuits 111-114 (shown in FIG. 2A). Each of the sub-control circuits 111-114 is configured to control the corresponding fan-out partition 121-124 to be turned on or off according to logic operations performed by the test signals In1-Inn and the enable signal En.

Further, in other embodiments that there are n fan-out partitions 121-12n in the testing circuit 1, the control circuit 11 includes corresponding n sub-control circuits 111-11n to control output signals Out[n−1:0] respectively. Thus, the fan-out partitions 121-12n could be turned on or off according to the corresponding output signal Out [n−1:0].

In an embodiment, referring to FIG. 2A, each of sub-control circuits 111-114 comprises AND gates A1-A4, a first OR gate O1, and a second OR gate O2. Every AND gate may receive a corresponding bit of the corresponding test signal and a corresponding bit of the enable signal En to generate the first selected signal. The first OR gate O1 may be configured to receive the first selected signals provided from the AND gates A1-A4 to generate a second selected signal. The second or gate O2 may receive a select enable signal SC and the second selected signal to generate the output signal for controlling the corresponding fan-out partition.

Figure 2B:
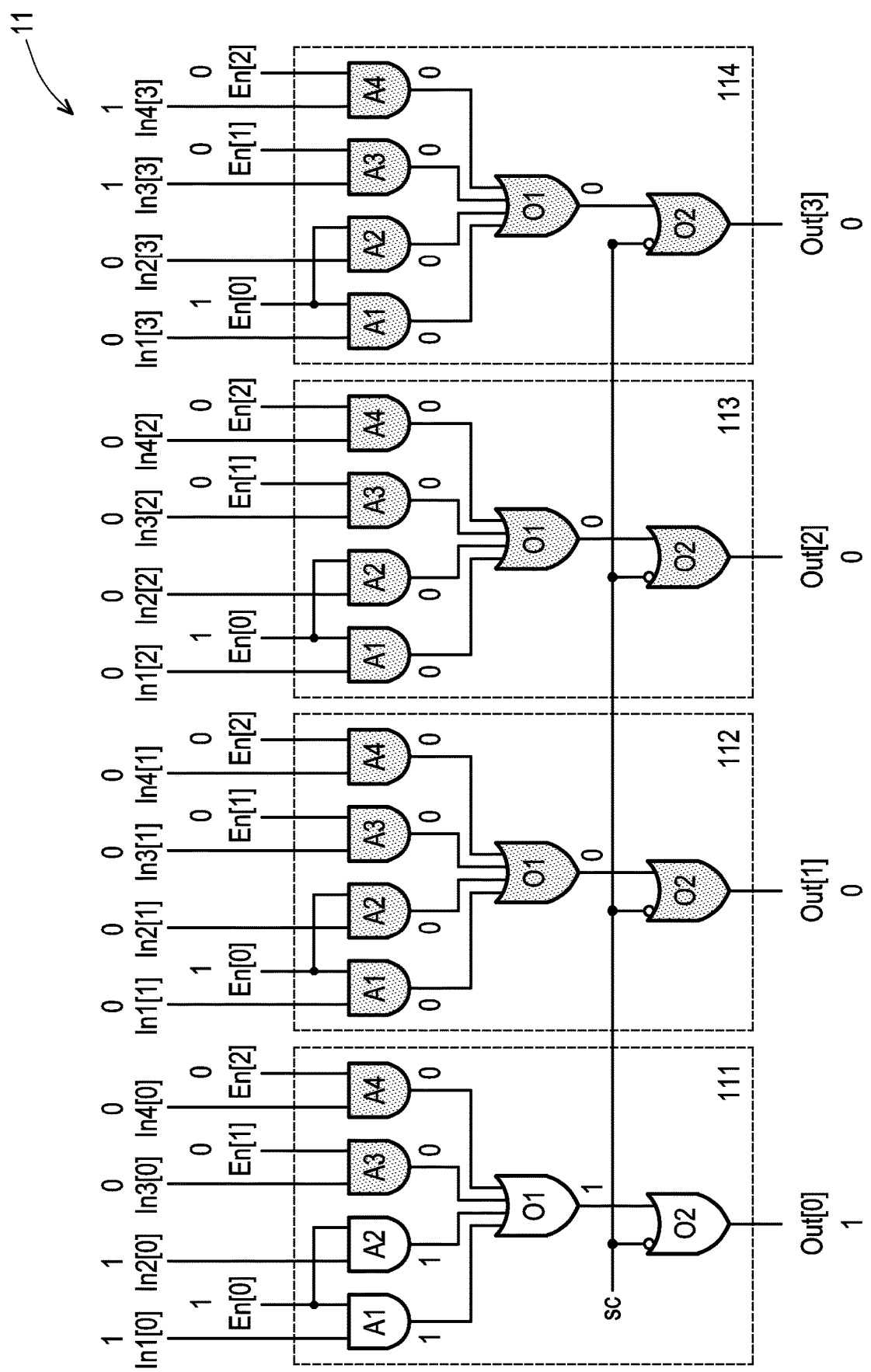
FIG. 2B is a possible testing scenario of the "control circuit 11" according to an embodiment of the subject application.

The Table 1 below exemplarily shows how the enable signal En is set corresponding to n-hot test cases. FIG. 2B is a possible testing scenario of a control circuit 11 according to an embodiment of the subject application. When it is decided that a design is testing with the 2-hot configuration, and there are 4 fan-out partitions in the design. By looking up Table 1, the enable signal En should set as En[0]=1; En[1]=0; En[2]=0 for 2-hot configuration. For the pattern of test signals In1-In4 {(In1[0]=1, In1[1]=0, In1[2]=0, In1[3]=0); (In2[0]=1, In2[1]=0, In2[2]=0. In2[3]=0); (In3[0]=0. In3[1]=0. In3[2]=0. In3[3]=1); (In4[0]=0. In4[1]=0. In4[2]=0. In4[3]=1)} shift out to the sub-control circuits 111-114, the fan-out partition 121 that receives the output signal Out[0] would be turned on while others are turned off.

TABLE 1

| En[N − 1] = ($2^{N-1}$) | ... | En[2] = ($2^2$) | En[1] = ($2^1$) | En[0] = ($2^0$) | N HOT Config |
|---|---|---|---|---|---|
| 0 | | 0 | 0 | 1 | 2 |
| 0 | | 0 | 1 | 1 | 3 |
| 0 | | 1 | 1 | 1 | 4 |
| | ... | | | | |
| 1 | | 1 | 1 | 1 | N |

Figure 2C:
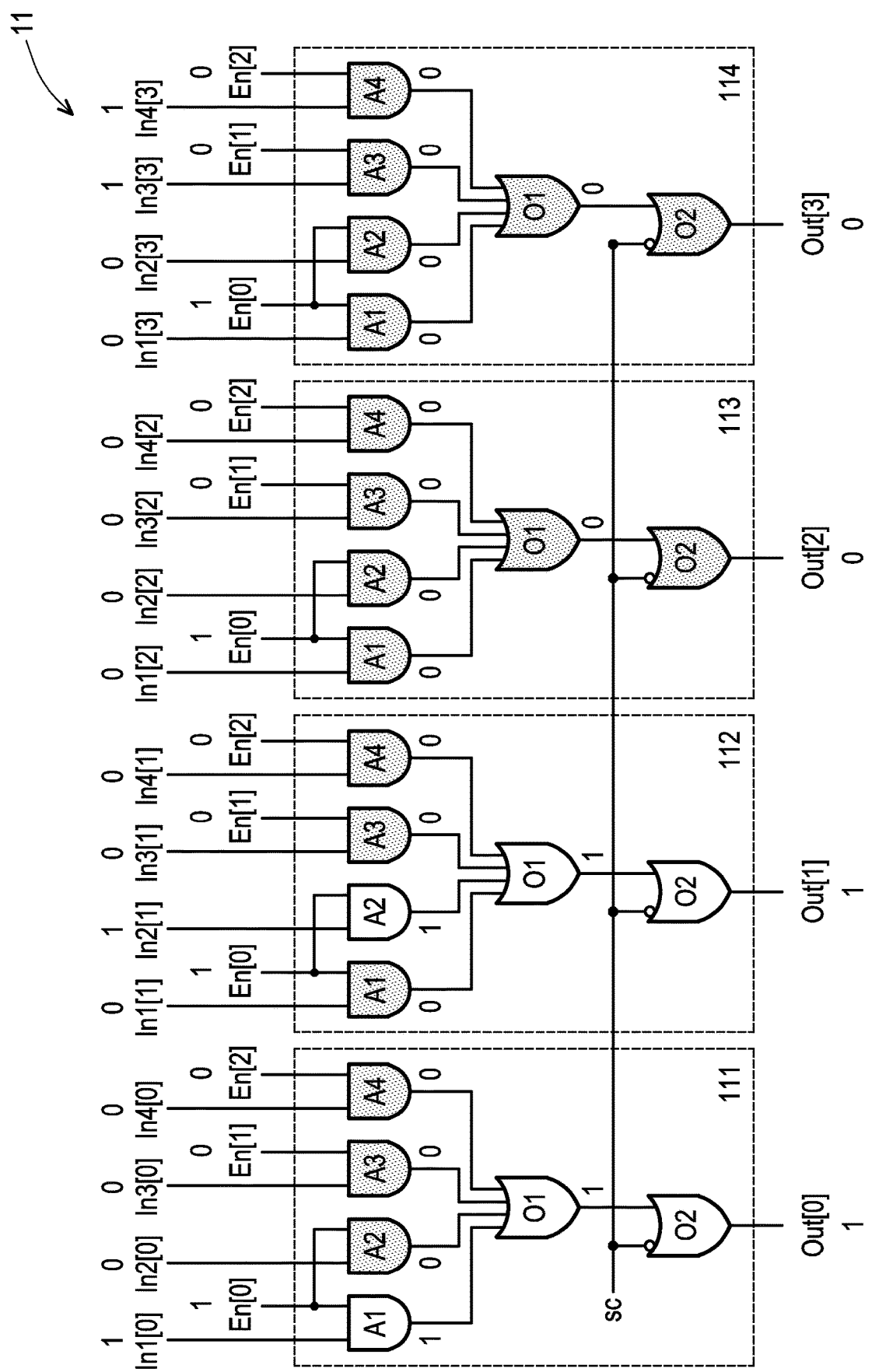
FIG. 2C is the other possible testing scenario of the "control circuit 11" according to an embodiment of the subject application.

FIG. 2C is the other possible testing scenario of a control circuit 11 according to the embodiment of the subject application. In the second example, for the pattern of test signals In1-In4 {(In1[0]=1, In1[1]=0, In1[2]=0, In1[3]=0); (In2[0]=0, In2[1]=1, In2[2]=0, In2[3]=0); (In3[0], In3[1]=0, In3[2]=0. In3[3]=1); (In4[0]=0, In4[1], In4[2]=0. In4[3]=1)} shift out to the sub-control circuits 111-114, the fan-out partitions 121-122 that receives the output signals Out[0] and Out[1] respectively, would be turned on while others are turned off. To sum up, when the test case is set to 2-hot configuration, there are two partitions could be turned on at most. The design with n fan-out partitions can do from at least 2-hot configuration to n-hot configuration implementation on demand.

Similarly, operations of the sub-control circuits 111-114 that perform the 3-hot configuration to the n-hot configuration are similar to the 2-hot configuration, except that the bit data of the received enable signal En are set to 011 and 111 respectively.

Figure 3:
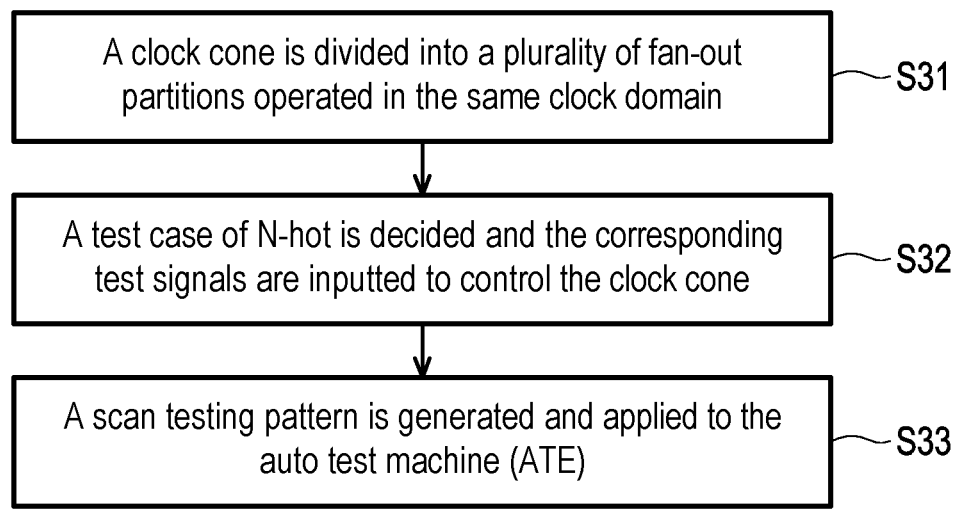
FIG. 3 is a flow chart of the testing method according to an embodiment of the subject application.

FIG. 3 is a flow chart of a testing method according to an embodiment of the subject application. The testing method shown in FIG. 3 could be applied to any device that inserted n-hot circuit. The testing method comprises steps S31-S32.

In step S31, a clock cone is divided into a plurality of fan-out partitions operated in the same clock domain. In step S32, a test case of n-hot configuration is decided and the corresponding test signals would be therefore inputted to control the clock cone. In step S33, a scan testing pattern is generated and applied to the auto test machine (ATE).

As explained in relation to the operation perform by the testing circuit 1 in FIG. 1 and the control circuit 11 in FIG. 2A, the enable signal En could be decided once the test case of the n-hot configuration is settled. Then, the shift register chains 101-10n may receive and shift out a plurality of test signals In1-Inn to the control circuit 11, such that the control circuit 11 may generate a corresponding output signal Out [n−1:0] according to the received enable signal En and the test signals In1-Inn. The test signals In1-Inn such as one-hot signals which is the signal having a random bit with the value of 1.

In some embodiments, while an n-hot configuration is set, the control circuit 11 may be operated in a first run to control and turn on a number of the fan-out partitions 121-124 for testing, and obtain the first test result accordingly. Furthermore, the value of number is related to the value of n-hot configuration. When the first test result does not meet the preset condition (e.g., when the test yield of the chip does not meet the preset yield), the testing method may need to do further test analysis to decide a new n-hot configuration.

In some embodiments, when the first test result does not meet the preset condition, the control circuit 11 may need a second run to decide and turn on a new number of the fan-out partitions 121-124 according to the test signals In1-In4 for testing. In some embodiments, the new number is less than the number in the first run but greater or equal than two (i.e., the minimum value of number is two which regarded as 2-hot configuration). In other words, when the first test result does not meet the preset condition, the testing method turns to turn on fewer partitions subsequently.

In some embodiments, in the tests carried out by the control circuit 11 in the first run, turning on a number of the fan-out partitions 121-124, for example, turning on all fan-out partitions 121-124 while the test case is set to 4-hot configuration. In the tests carried out in the second run, turning on a new number of the fan-out partitions 121-124, for example, turning on at most two of the fan-out partitions 121-124 while the test case is set to 2-hot configuration. In some embodiments, the new number is less than the number in the first run but greater or equal than two. It means the n-hot setting change from 4-hot configuration to 2-hot configuration.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A testing circuit, comprising:
   a clock cone, divided into a plurality of fan-out partitions operated in the same clock domain;
   a plurality of shift register chains, configured to shift out a series of test signals, each shift register chain comprises a number of registers with the same amount of the fan-out partitions; and
   a control circuit, connected to the clock cone and the plurality of shift register chains for receiving the series of test signals and an enable signal, the control circuit being configured to control all of the fan-out partitions according to the series of test signals and the enable signal, wherein each test signal is a one-hot signal which has a random bit with the value of 1, wherein each bit of the test signal is used to turn on or turn off of a corresponding one of the fan-out partitions, and the enable signal corresponds to a maximum number of the fan-out partitions that are turned on for testing.

2. The testing circuit of claim 1, wherein the control circuit is configured to decide the number of the fan-out partitions to be turned on according to the enable signal.

3. The testing circuit of claim 2, wherein the control circuit is configured to decide an actual number of the fan-out partitions to be turned on according to the series of test signals.

4. The testing circuit of claim 3, wherein the control circuit comprises:

a plurality of sub-control circuits, each of the sub-control circuits being configured to control each corresponding fan-out partition to be turned on or off according to the series of test signals and the enable signal.

5. The testing circuit of claim 4, wherein each of the sub-control circuits comprises:

a plurality of AND gates, each AND gate receives the corresponding bit of the shift register chain and a corresponding bit of the enable signal, to generate a first level selected signal;

a first OR gate, the first OR gate being configured to receive the plurality of first level selected signals to generate a second level selected signal; and a second OR gate connected to the output of the first OR gate, the second OR gate being configured to receive a select enable signal and the second level selected signal to generate an output signal for controlling the corresponding fan-out partition.

6. The testing circuit of claim 2, wherein the control circuit is configured to execute a first run to turn on the number of the fan-out partitions for testing and obtain a first test result, and when the first test result does not meet a preset condition, the control circuit is configured to execute a second run to decide and turn on a new number of the fan-out partitions for testing, wherein the new number is less than the number in the first run but greater than or equal to two.

* * * * *